United States Patent
Lawrence et al.

(10) Patent No.: US 7,410,212 B2
(45) Date of Patent: Aug. 12, 2008

(54) CHILD RESTRAINT SYSTEM

(75) Inventors: Rodney A. Lawrence, Frankfort, IN (US); Kevin D. Kincaid, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 39 days.

(21) Appl. No.: 11/222,229

(22) Filed: Sep. 8, 2005

(65) Prior Publication Data

US 2006/0049677 A1 Mar. 9, 2006

Related U.S. Application Data

(60) Provisional application No. 60/607,988, filed on Sep. 8, 2004.

(51) Int. Cl.
*A47C 7/62* (2006.01)
*A47C 1/10* (2006.01)

(52) U.S. Cl. ................. 297/217.3; 297/250.1
(58) Field of Classification Search ............ 297/250.1, 297/217.2, 217.3; 361/686
See application file for complete search history.

(56) References Cited

U.S. PATENT DOCUMENTS

| | | | |
|---|---|---|---|
| 5,260,684 A | 11/1993 | Metzmaker | |
| 5,454,591 A | 10/1995 | Mazur et al. | |
| 5,581,234 A * | 12/1996 | Emery et al. | 340/457.1 |
| 5,656,994 A | 8/1997 | Heninger | 340/457.1 |
| 5,711,574 A | 1/1998 | Barnes | 297/216.11 |
| 5,720,519 A | 2/1998 | Barnes | 297/216.11 |
| 6,151,540 A | 11/2000 | Anishetty | 701/45 |
| 6,203,059 B1 | 3/2001 | Mazur et al. | |
| 6,246,936 B1 | 6/2001 | Murphy et al. | 701/45 |
| 6,255,790 B1 | 7/2001 | Popp et al. | |
| 6,259,042 B1 | 7/2001 | David | |
| 6,264,236 B1 | 7/2001 | Aoki | |
| 6,272,936 B1 | 8/2001 | Oreper et al. | 73/862.621 |
| 6,356,187 B2 | 3/2002 | Jinno et al. | |
| 6,371,516 B1 | 4/2002 | Miyagawa | 280/735 |
| 6,382,667 B1 | 5/2002 | Aoki | |
| 6,438,476 B1 | 8/2002 | Gray et al. | 701/45 |
| 6,459,973 B1 | 10/2002 | Breed et al. | |
| 6,463,372 B1 | 10/2002 | Yokota et al. | |
| 6,480,616 B1 | 11/2002 | Hata et al. | |

(Continued)

FOREIGN PATENT DOCUMENTS

GB 2290505 1/1996

OTHER PUBLICATIONS

International Search Report dated Jan. 10, 2007 for PCT/US2005/32175.

(Continued)

*Primary Examiner*—Sarah B McPartlin
(74) *Attorney, Agent, or Firm*—Douglas D. Fekete

(57) ABSTRACT

A child restraint system that is adapted to be mounted within a vehicle is provided. The child restraint system includes a child seat configured to receive a child occupant. The child seat has a frame, at least first and second docking stations, and a child seat monitoring device. The first and second docking stations are disposed at first and second locations on the frame. Both of the first and second docking stations are configured to receive and hold the child seat monitoring device therein.

20 Claims, 7 Drawing Sheets

U.S. PATENT DOCUMENTS

| | | | |
|---|---|---|---|
| 6,490,936 B1 | 12/2002 | Fortune et al. | 73/862.581 |
| 6,502,860 B1 * | 1/2003 | Siegfried et al. | 280/801.1 |
| 6,529,381 B1 * | 3/2003 | Schoenfish | 361/725 |
| 6,554,318 B2 | 4/2003 | Kohut et al. | 280/801.1 |
| 6,578,871 B2 | 6/2003 | Gray et al. | 280/735 |
| 6,587,770 B1 | 7/2003 | Gray et al. | 701/45 |
| 6,595,545 B2 | 7/2003 | Curtis et al. | |
| 6,605,877 B1 | 8/2003 | Patterson et al. | 307/10.1 |
| 6,644,689 B2 | 11/2003 | Murphy | 280/735 |
| 6,650,978 B1 | 11/2003 | Patterson et al. | 701/35 |
| 6,662,094 B2 | 12/2003 | Murphy et al. | 701/45 |
| 6,683,534 B2 | 1/2004 | Patterson et al. | 340/436 |
| 6,749,038 B2 | 6/2004 | Sullivan et al. | 780/268 |
| 6,796,192 B2 | 9/2004 | Sullivan et al. | 73/862.391 |
| 6,812,844 B1 | 11/2004 | Burgess | 340/573.1 |
| 6,818,842 B2 | 11/2004 | Gray et al. | 177/144 |
| 6,847,302 B2 | 1/2005 | Flanagan et al. | 340/666 |
| 6,850,825 B2 | 2/2005 | Murphy et al. | 701/45 |
| 6,851,503 B2 | 2/2005 | Almaraz et al. | 180/268 |
| 6,854,415 B2 | 2/2005 | Barnes et al. | 116/67 R |
| 6,863,286 B2 * | 3/2005 | Eros et al. | 280/47.38 |
| 6,868,745 B2 | 3/2005 | Sullivan et al. | 73/862.391 |
| 6,889,146 B2 | 5/2005 | Sullivan et al. | 702/43 |
| 6,958,451 B2 | 10/2005 | Breed et al. | |
| 7,004,541 B2 * | 2/2006 | Sedlack | 297/256.13 |
| 7,021,709 B2 | 4/2006 | Dolan et al. | |
| 7,029,068 B2 | 4/2006 | Yoshida et al. | |
| 7,134,687 B2 | 11/2006 | Breed et al. | |
| 2004/0113797 A1 * | 6/2004 | Osborne | 340/573.4 |
| 2005/0090959 A1 | 4/2005 | Winkler | |
| 2005/0092539 A1 | 5/2005 | Chitalia et al. | |
| 2005/0121956 A1 | 6/2005 | Dolan et al. | |
| 2005/0189805 A1 | 9/2005 | Burley et al. | |
| 2005/0194779 A1 | 9/2005 | Ito et al. | |
| 2005/0275276 A1 * | 12/2005 | Patterson et al. | 297/479 |
| 2006/0057900 A1 | 3/2006 | Winkler | |

OTHER PUBLICATIONS

Written Opinion of the International Searching Authority dated Jan. 10, 2007 for PCT/US2005/32175.

* cited by examiner

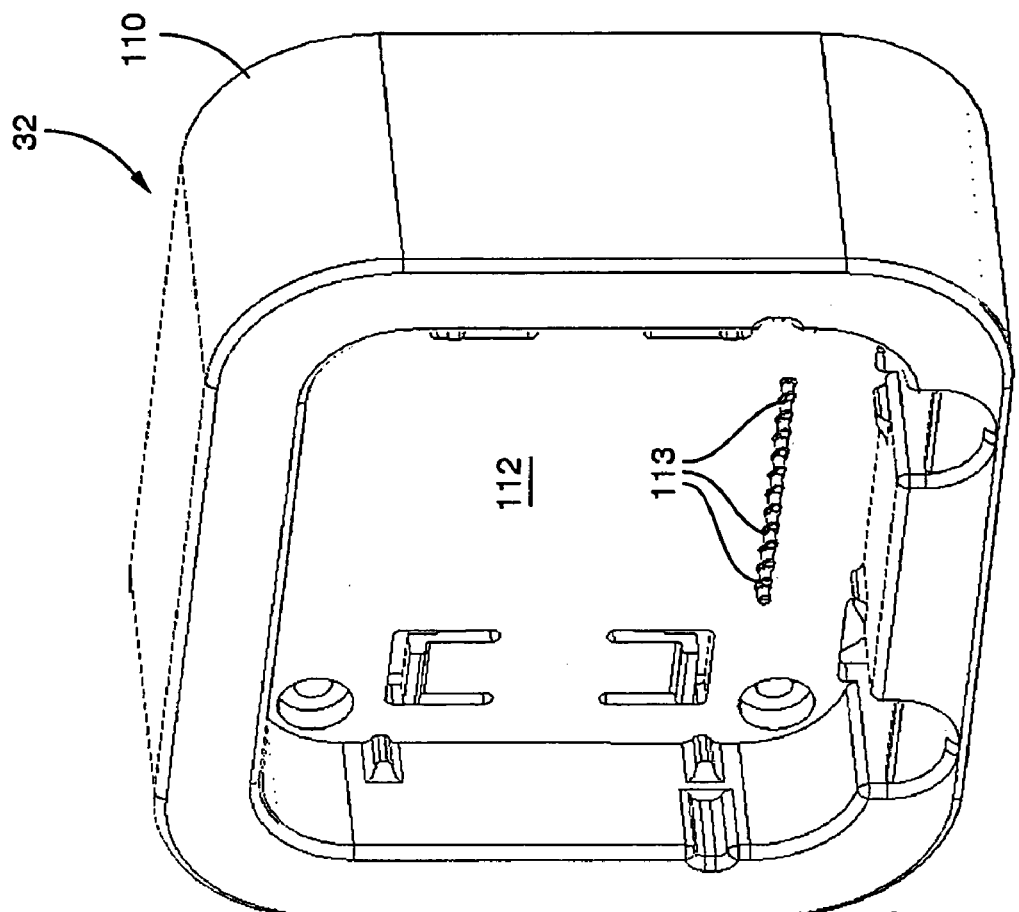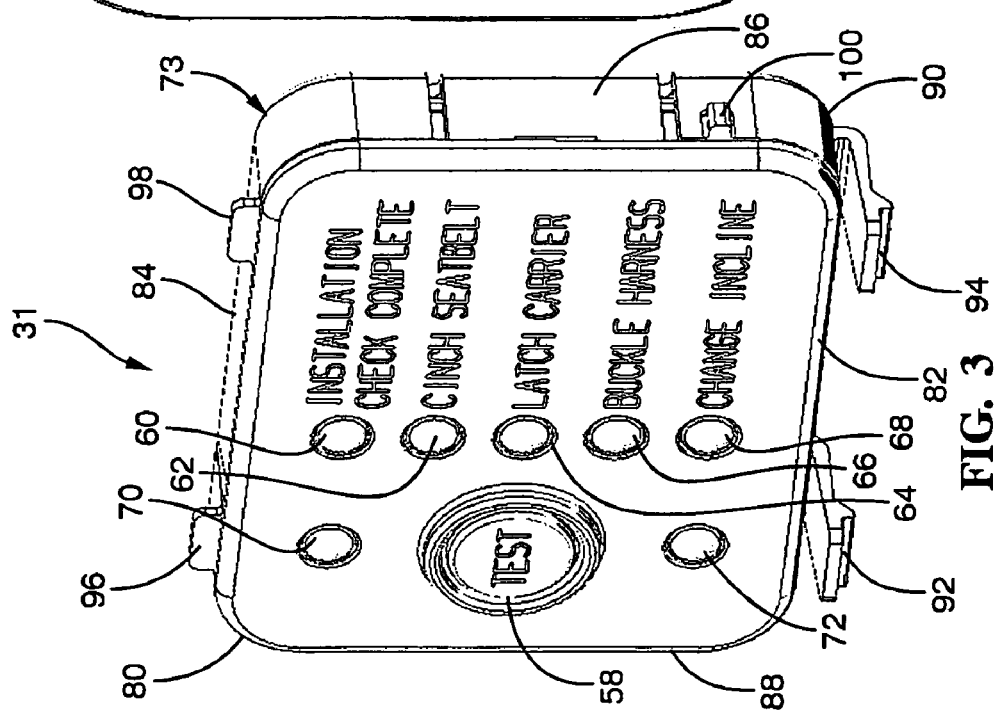

CHILD RESTRAINT SYSTEM

CROSS REFERENCE TO RELATED APPLICATIONS

The application claims the benefit of U.S. Provisional application, Ser. No. 60/607,988, filed Sep. 8, 2004, the contents of which are incorporated herein by reference thereto.

This application is also related to the following United States Patent Applications: CHILD SEAT AND MONITORING SYSTEM; CHILD SEAT MONITORING SYSTEM AND METHOD FOR DETERMINING A TYPE OF CHILD SEAT; CHILD RESTRAINT SYSTEM AND METHOD FOR MONITORING INSTALLATION OF THE CHILD RESTRAINT SYSTEM; CHILD RESTRAINT SYSTEM COMPRISING WEIGHT SENSOR; CHILD RESTRAINT SYSTEM COMPRISING CONTROL UNIT FOR EVALUATING HARNESS ADJUSTMENT; CHILD RESTRAINT SYTSEM AND METHOD FOR MONITORING INSTALLATION OF THE CHILD RESTRAINT SYSTEM, the contents of which are each incorporated herein by reference thereto.

TECHNICAL FIELD

This application relates to a child restraint system utilizing a child seat monitoring device.

BACKGROUND

Child restraint systems have been utilized to hold infants or children therein within vehicles. One type of child restraint system includes a child seat and a base portion for holding the seat, that are rearward-facing with respect to a vehicle seat. The child restraint system, however, does not have a child seat monitoring device that provides visual feedback messages to a person installing the child restraint system indicating whether the child restraint system has been properly installed on the vehicle seat. Further, the child restraint system does not have a plurality of docking stations on the child seat for allowing the child seat monitoring device to be disposed in one of the docking stations that can be easily viewed by the person installing the child restraint system.

SUMMARY

A child restraint system that is adapted to be mounted within a vehicle in accordance with an exemplary embodiment is provided. The child restraint system includes a child seat configured to receive a child occupant. The child seat has a frame, at least first and second docking stations, and a child seat monitoring device. The first and second docking stations are disposed at first and second locations on the frame. Both of the first and second docking stations are configured to receive and hold the child seat monitoring device therein.

A child seat monitoring device in accordance with another exemplary embodiment is provided. The child seat monitoring device includes a removable housing configured to be removably secured to at least one docking station disposed on a child seat. The child seat monitoring device further includes a processing unit disposed in the housing. The processing unit is configured to be electrically coupled to at least a first sensor when the housing is disposed in the docking station on the child seat. The first sensor generates a first signal indicative of a child seat parameter. The processing unit is further configured to receive the first signal and to determine whether the child seat is installed in a vehicle in accordance with a predetermined installation parameter based on the first signal.

BRIEF DESCRIPTION OF THE DRAWINGS

FIG. 3 is a schematic of a child seat monitoring device utilized in the child seat monitoring system of FIG. 1 in accordance with an exemplary embodiment;

FIG. 4 is a schematic of a docking station utilized in the child seat of FIG. 2;

DESCRIPTION OF EXEMPLARY EMBODIMENTS

Figure 1:
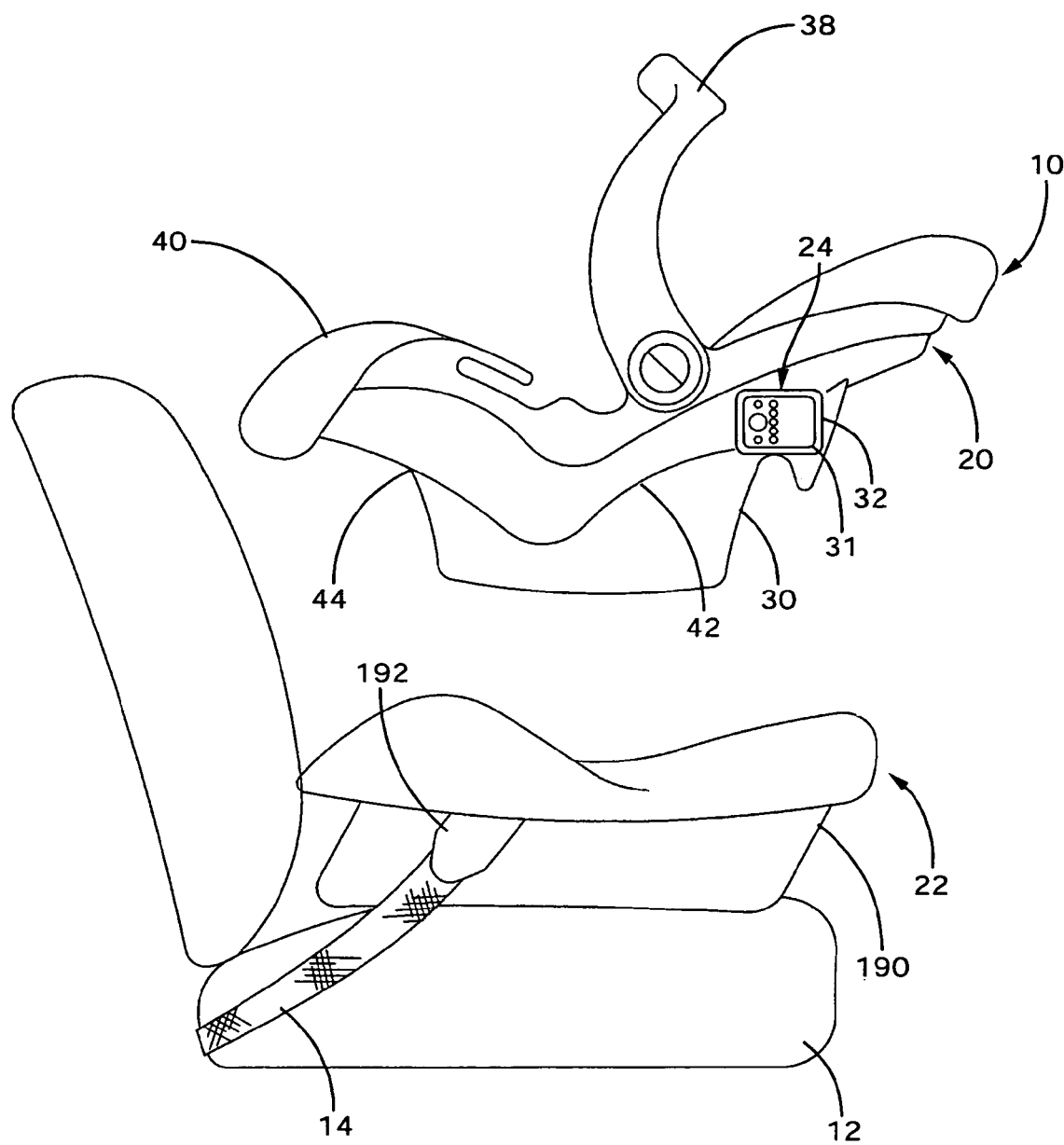
FIG. 1 is a schematic of a child restraint system having a child seat, a base portion, and a child seat monitoring system in accordance with an exemplary embodiment.

Referring to FIGS. 1 and 4, a child restraint system 10 that can be secured to a vehicle seat 12 in accordance with an exemplary embodiment is provided. In particular, the child restraint system 10 is secured to the vehicle seat 12 utilizing the seat belt webbing 14. The child restraint system 10 includes a child seat 20, a base portion 22, and a child seat monitoring system 24.

Figure 2:
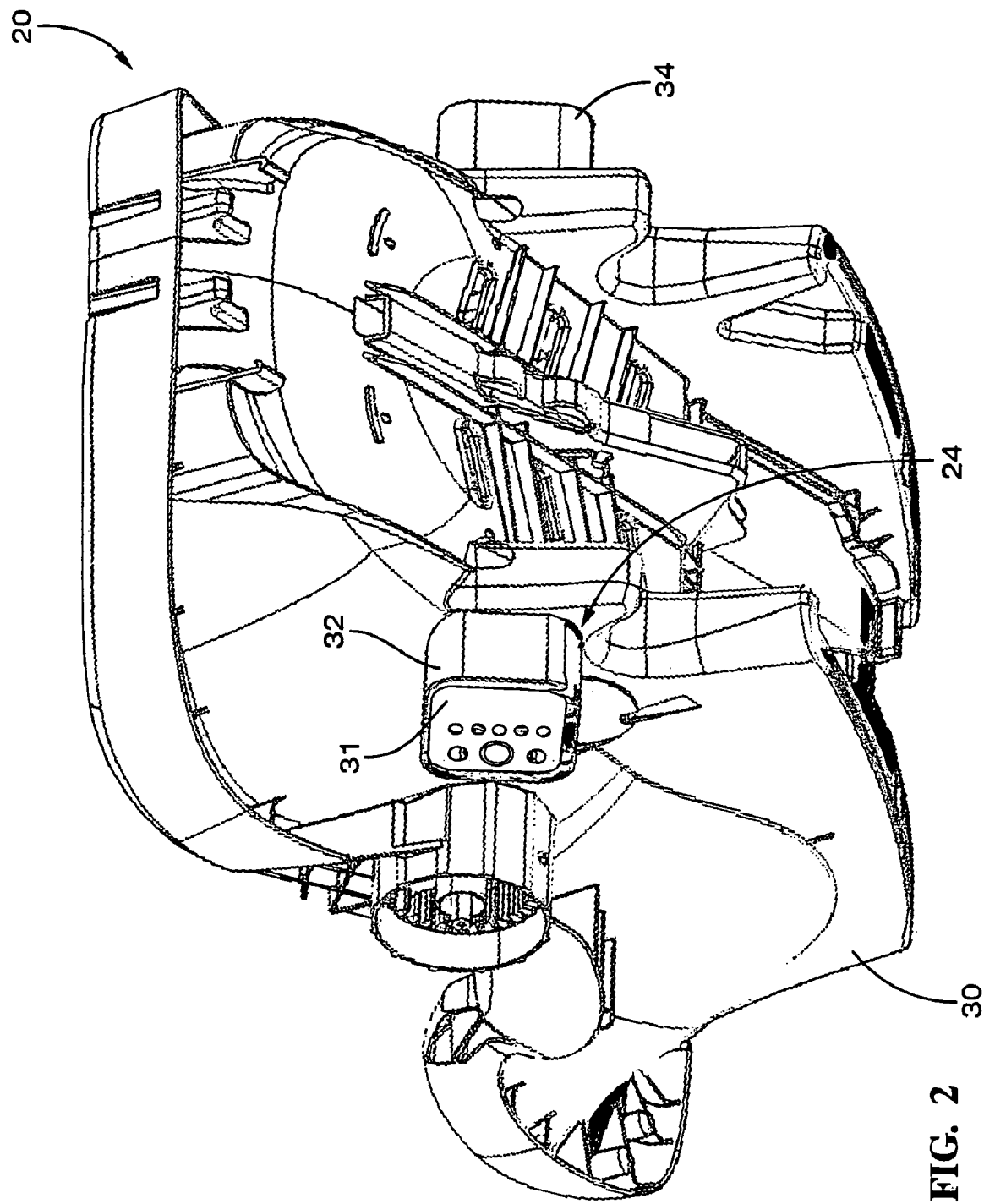
FIG. 2 is a schematic of the child seat in the child restraint system of FIG. 1.

Referring to FIGS. 1 and 2, the child seat 20 comprises a rearward facing child seat that is configured to accommodate a child therein for transporting the child both inside and outside of a vehicle. The child seat 20 is configured to be fixedly secured to the base portion 22 and the base portion 22 is further secured via the seat belt webbing 14 to the seat 12 or to a frame of a vehicle. The child seat 20 includes a shell or frame 30, a child seat monitoring device 31, docking stations 32, 34, a handle 38, and the cushion 40.

The frame 30 defines a compartment for accommodating the child therein. The frame 30 includes a back portion 42, a seat portion 44. The back portion 42 supports a back of the child and the seat portion 44 supports the buttocks and legs of the child.

Figure 5:
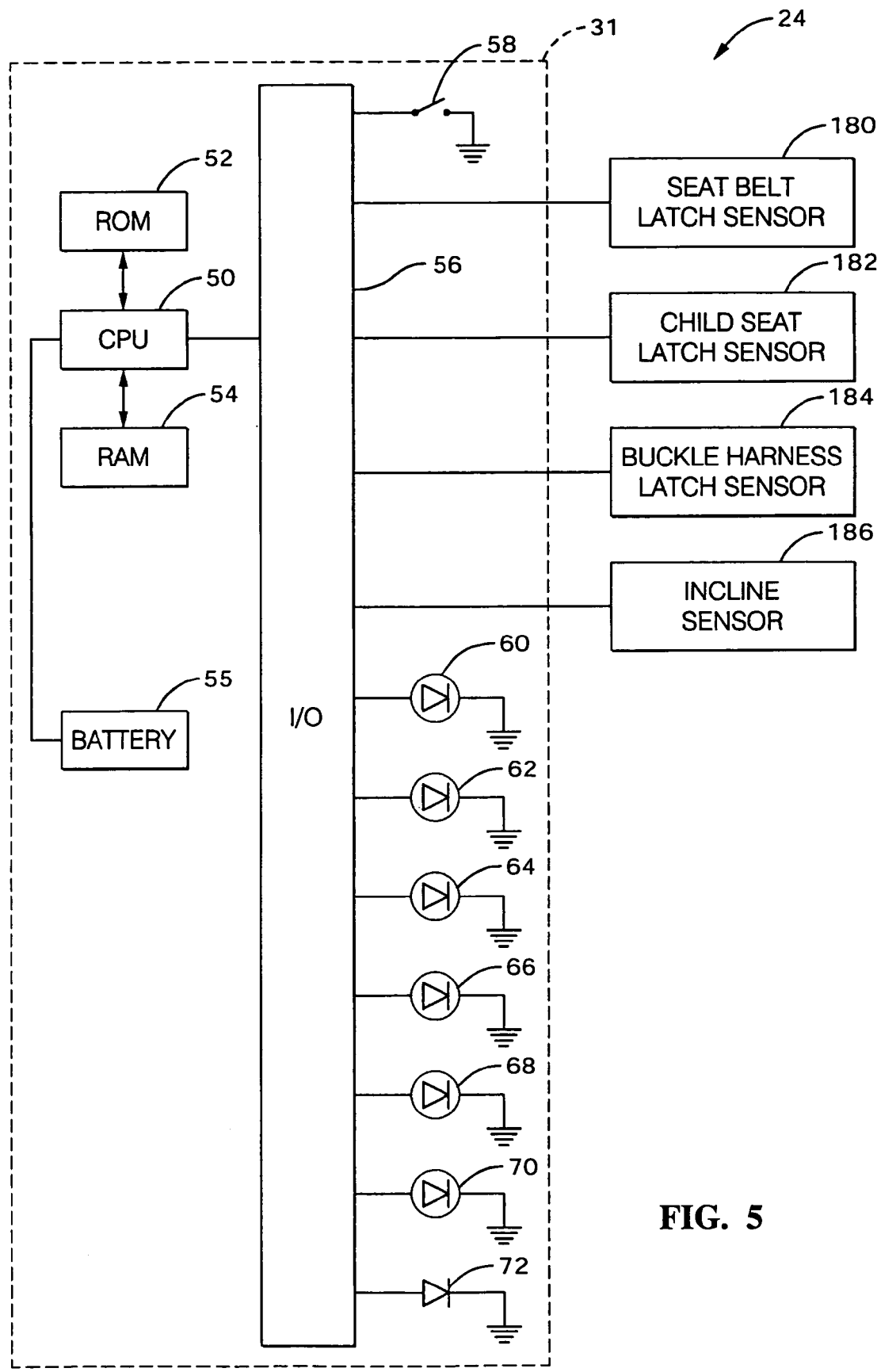
FIG. 5 is an electrical schematic of the child seat monitoring system of FIG. 1.
Figure 6:
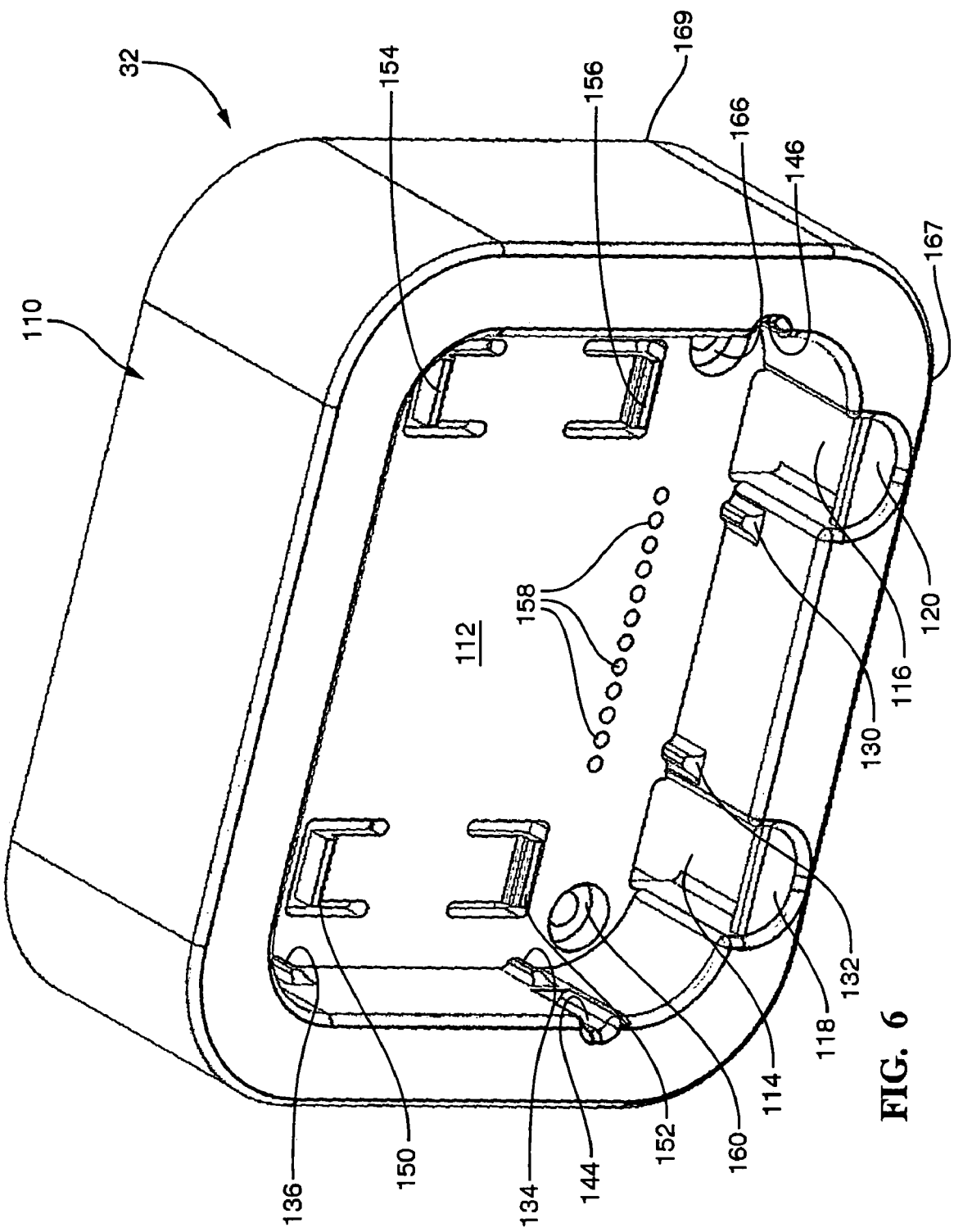
FIG. 6 is a schematic of the docking station of FIG. 4.
Figure 7:
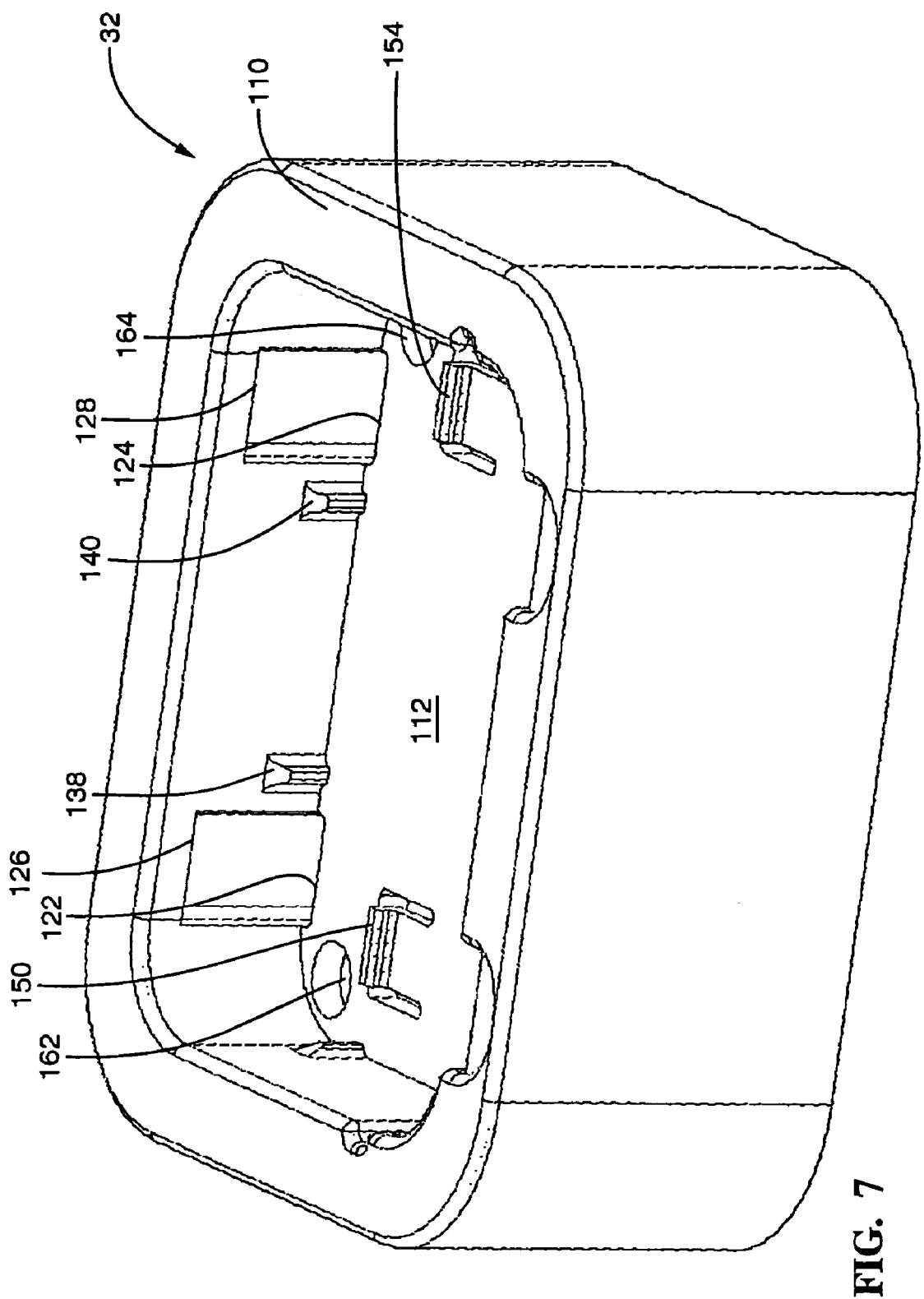
FIG. 7 is another schematic of the docking station of FIG. 4.
Figure 8:
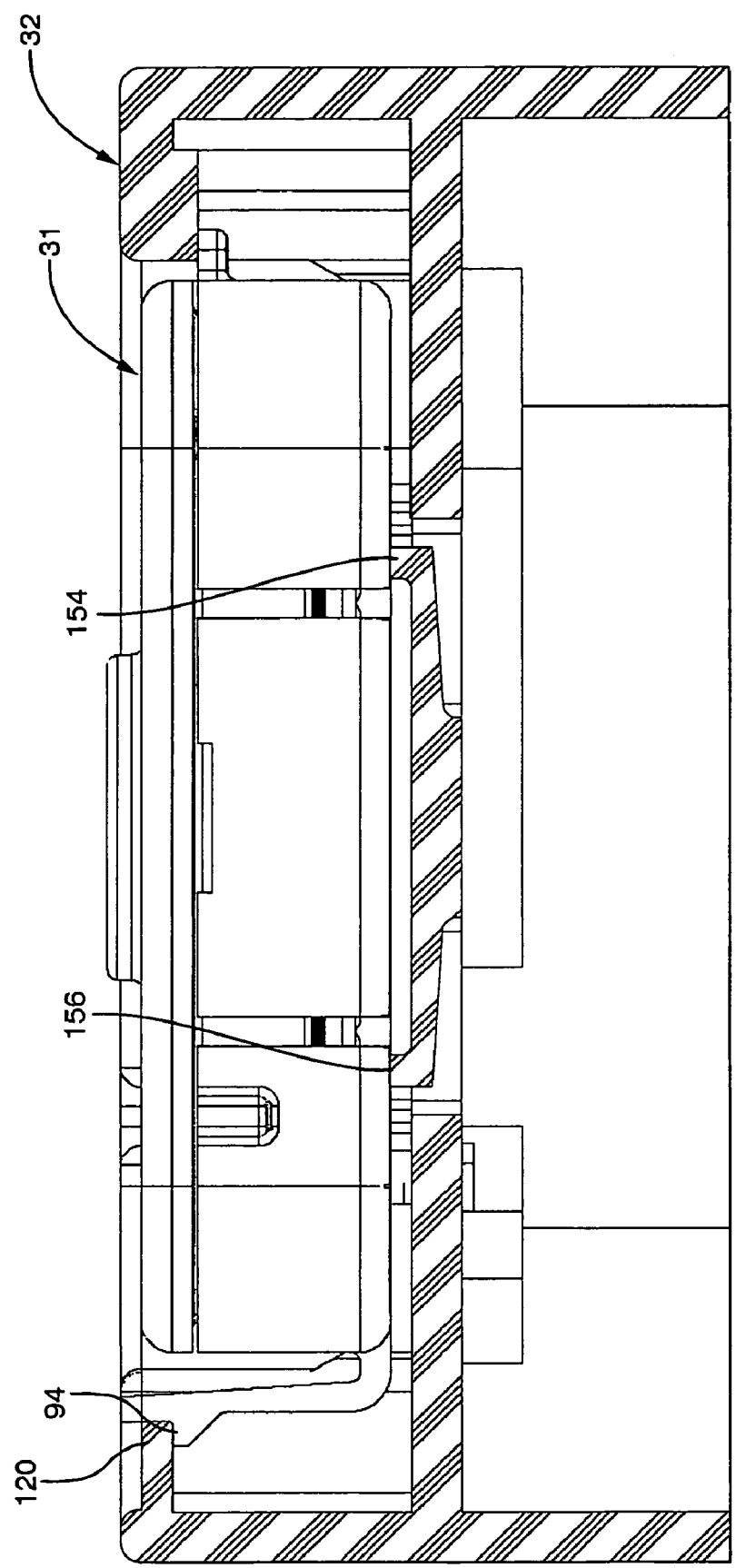
FIG. 8 is a cross-sectional schematic of the docking station of FIG. 4.

Referring to FIGS. 3 and 5, the child seat monitoring device 31 is provided to provide visual feedback messages to a person who is installing the child restraint system 10 on the vehicle seat 12 on whether the child restraint system 10 has been installed in accordance with predetermined installation guidelines. The child seat monitoring device 31 includes an integrated circuit board (not shown) having a processing unit such as a central processing unit (CPU) 50, a read-only memory (ROM) 52, a random access memory (RAM) 54, a battery 55, an input/output (I/O) interface 56, a switch 58, light emitting diodes (LEDs) 60, 62, 64, 66, 68, 70, and a photodiode 72. The child seat monitoring device 31 further includes a housing 73 for holding the integrated circuit board therein. The CPU 50 is provided to execute software algorithins stored in either the ROM 52 or the RAM 54 for determining whether the child restraint system 10 has been installed in accordance with the predetermined installation guidelines. The CPU 50 operably communicates with the ROM 52, the RAM 54 and the I/O interface 56. The switch 58 is provided to allow a person to induce the CPU 50 to monitor the various sensors of the child seat monitoring system 24 and to provide visual feedback information to a person. In particular, the CPU 50 generates a signal to induce the LED 60 to emit light when the CPU 50 has completed the check on the installation of the child restraint system 10. Further, the CPU 50 generates a signal to induce the LED 62 to emit light when a seat belt coupled to the base portion 12 is not cinched properly. Further, the CPU 50 generates a signal to induce the LED 64 to emit light when a latching device (not shown) which latches the child seat 20 to the base portion 22 has not been latched properly. Further, a CPU 50 generates a signal to induce the LED 66 to emit light when a buckle harness on the child seat 20 has not been latched properly. Further, the CPU 50 generates a signal to induce the LED 68 to emit light when the child seat is not orientated within a desired angular range. Further, the CPU 50 generates a signal to induce the LED 70 to emit light when a battery 55 is outputting a voltage less than a predetermined voltage level. The photodiode 72 is provided to indicate when an ambient light is less than a predetermined light level. When the ambient light is less than the predetermined light level, the CPU 50 increases an intensity of light emitted from the LEDs.

Referring to FIG. 3, the housing 73 is provided to enclose the CPU 50, the ROM 52, the RAM 54, and the I/O interface 56. Further, the housing 73 is provided to hold the switch 58 and the LEDs 60, 62, 64, 66, 68, 70 thereon. The housing 73 include side walls 80, 82, 84, 86, 88, 90, latching members 92, 94, tab portions 96, 98, and two guiding members 100 (one of which is shown). The switch 58 and the LEDs 60, 62, 64, 66, 68, 70 are disposed on the side wall 80. The side walls 82, 84 are coupled to the side wall 80 and extend in a first direction generally parallel to one another. The side walls 86, 88 are also coupled to the side wall 80 and extend in a first direction generally parallel to one another. The side wall 90 is operably coupled to the side walls 82, 84, 86, 88 and is disposed opposite the side wall 80. The latching members 92, 94 extend from the side wall 82 and are provided to latch the child seat monitoring device 31 to one of the docking stations 32, 34. The tab portions 96, 98 extend from the sidewall 84 and are also provided to hold the child seat monitoring device 31 in one of the docking stations 32, 34. Guiding members 100 extend outwardly from side walls 86, 88 and are provided to assist a person in guiding the child seat monitoring device 31 into an interior region of one of the docking stations 32, 34.

Referring to FIG. 2, the docking stations 32, 34 are disposed on opposite sides of the child seat 20. The docking stations 32, 34 are configured to allow a person to latch the child seat monitoring device 31 into either of the docking stations 32, 34. Further, the docking stations 32, 34 are configured to allow the person to remove the child seat monitoring device 31 from either of the docking stations 32, 34. Thus, the docking stations 32, 34 allow the person to locate the device 31 at one of the docking stations 32, 34 that is most easily viewable by the person when installing the child restraint system 10. Of course, more than two docking stations could be utilized on the child seat 20. Further, the position of the docking stations 32, 34 can be varied based upon a desired viewing location. In one exemplary embodiment, the docking stations 32, 34 are attached to the child seat 20 via screws. Of course, in an alternate embodiment, the docking stations 32, 34 can be molded as a portion of the child seat 20. Because the configuration of the docking station 34 is substantially similar to the docking station 32, only the configuration of the docking station 32 will be described in greater detail below for purposes of simplicity.

Referring to FIGS. 4, and 6-8, a non-limiting example of a docking station is illustrated. As shown, the docking station 32 includes an outer peripheral wall 110, a rear wall 112, and a plurality of electrical terminals 113. The outer peripheral wall 110 and the rear wall 112 define an interior region for receiving the child seat monitoring device 31. The outer peripheral wall 110 is a generally rectangular ring-shaped wall extending from an end 167 to an end 169. The rear wall 112 encloses the end 169 of the outer peripheral wall 110. The outer peripheral wall 110 includes grooves 114, 116 extending from the second end 169 towards the first end 167. The outer peripheral wall 110 further includes wall portions 118, 120 disposed in the grooves 114, 116, respectively proximate the end 167 for holding portions of the latching members 92, 94, respectively, therein. The latching members 92, 94 have a first operational position where the members 92, 94 engage the wall portions 118, 120, respectively, and a second operational position where the members 92, 94 disengage from the wall portions 118, 120 respectively. The outer peripheral wall 110 includes grooves 122, 124 extending from the end 169 towards the end 167. The outer peripheral wall 110 further includes wall portions 126, 128 disposed in the grooves 122, 124, respectively, proximate the end 167 for holding the tab portions 96, 98, respectively, of the child seat monitoring device 31 therein. The outer peripheral wall 110 further includes centering tabs 130, 132, 134, 136, 138, 140 disposed proximate the rear wall 112. The centering tabs 130, 132, 134, 136, 138, 140 extend inwardly into the interior region of the docking station 32 for centering the housing 73 of the child seat monitoring device 31 within the interior region. The outer peripheral wall 110 further includes guiding slots 144, 146 extending from the side 167 inwardly into the wall 110. The guiding slots 144, 146 are configured to receive a pair of the guiding members 100 disposed on the child seat monitoring device 31 for guiding the device 31 into the interior region of the docking station 32. The rear wall 112 includes cantilever beam portions 150, 152, 154, 156 thereon. The cantilever beam portions 150, 152, 154, 156 are formed within the rear wall 112 and are provided to urge the housing 73 of the child seat monitoring device 31 toward the end 167 of the docking station 32. As a result, the latching members 92, 94 engage the wall portions 118, 120, respectively, of the outer peripheral wall 110 and the tab portions 96, 98 engage the wall portions 126, 128, respectively, for latching the child seat monitoring device 31 within the interior region of the docking station 32. The rear wall 112 further includes a plurality of apertures 158 extending therethrough for receiving the plurality of electrical terminals 113 therethrough. The electrical terminals electrically couple the child seat monitoring device 31 to the sensors 180, 182, 184, 186. Finally, the rear wall 112 further includes apertures 160, 162, 164, 166 extending therethrough for receiving screws (not shown) therein. The screws can be utilized to mount the docking station 32 to the frame of the child seat 20. Of course, other types of conventional coupling means can be utilized for mounting the docking station 32 to the child seat 20.

During installation of the child seat monitoring device 31 within the docking station 32, the tab portions 96, 98 are initially disposed in the grooves 122, 124 respectively, of the docking station 30 proximate the wall portions 126, 128, respectively. Next, the device 31 is moved into the interior region of the docking station 32, such that the latching members 92, 94 engage the wall portions 118, 120, respectively of the docking station 32.

During removal of the child seat monitoring device 31 from the docking station 32, the latching member 92, 94 are pushed upwardly to release the latching members from the wall portions 118, 120, respectively of the docking station 32. Next, the device 31 is moved outwardly from the interior region of the docking station 32 such that the tab portions 96, 98 are removed from the grooves 122, 124, respectively.

An advantage of the child seat monitoring device 31 is that the device 31 can be removed from either of the docking stations. Also, the device 31 can be removed from a docking station and reprogrammed with a different software algorithm. For example, the child seat monitoring device 31 could initially be programmed to determine whether the child seat has been installed properly for holding a child having a weight in a range of 10-20 pounds. Thereafter, the device 31 could be removed from a docking station and reprogrammed to determine whether the child seat has been installed properly for holding a child having a weight in a range of 20-30 pounds. Of course, many other parameters may be programmed into device 31.

Another advantage of the child seat monitoring device 31 is that the device 31 can be removed from a docking station for replacement of the battery 55.

Referring to FIG. 5, the child seat monitoring system 24 for determining whether the child restraint system 10 has been installed properly on the vehicle seat 12 based on child seat parameters is provided. For purposes of understanding, a child seat parameter comprises any value or signal that indicates a functional characteristic of: a child seat, a sensor associated with the child seat, or a device coupled to the child seat. For example, a child seat parameter can comprise a signal or value indicating whether a seat belt coupled to a child seat is latched, or a signal or value indicating whether a buckle harness on the child seat is latched. Further, a predetermined installation parameter comprises any value or signal that represents a desired installation characteristic of a child seat. For example, a predetermined installation parameter can comprise a latched condition of a seat belt or a latched condition of a buckle harness. The child seat monitoring system 24 includes the child seat monitoring device 31, a seat belt latch sensor 180, a child seat latch sensor 182, a buckle harness sensor 184, and an incline sensor 186.

The seat belt latch sensor 180 is provided to generate a signal indicating when a seat belt device coupled to the child restraint system 10 is properly latched. The seat belt latch sensor 180 is electrically coupled to the I/O interface 56. When the CPU 50 receives a signal from the sensor 180, the CPU 50 determines that the seat belt device has been properly latched. Otherwise, the CPU 50 determines that the seat belt device has not been properly latched, and induces the LED 62 to emit light.

The child seat latch sensor 182 is provided to generate a signal indicating when a child seat 20 is properly latched to the base portion 22. The child seat latch sensor 182 is electrically coupled to the I/O interface 56. When the CPU 50 receives a signal from the sensor 182, the CPU 50 determines that the child seat 20 has been properly latched to the base portion 22. Otherwise, the CPU 50 determines that the child seat has not been properly latched to the base portion 22 and induces the LED 64 to emit light.

The buckle harness sensor 184 is provided to generate a signal indicating when a buckle harness (not shown), disposed between a child's legs, is properly latched. The buckle harness sensor 184 is electrically coupled to the I/O interface 56. When the CPU 50 receives a signal from the sensor 184, the CPU 50 determines that the buckle harness has been properly latched. Otherwise, the CPU 50 determines that the buckle harness has not been properly latched and induces the LED 66 to emit light.

The incline sensor 186 is provided to generate a signal indicating an orientation angle of the child seat 20. The incline sensor 186 is electrically coupled to the I/O interface 56. When a signal from the incline sensor 186 indicates the child seat 20 is disposed at an angle within a predetermined angular range, the CPU 50 determines that the child seat 20 has been positioned at a proper orientation. Otherwise, the CPU 50 determines that the child seat 20 has not been positioned at a proper orientation and induces the LED 68 to emit light.

Referring again to FIG. 1, the handle 38 is coupled to the frame 30 and is provided to allow a user to easily lift the child seat 20. The handle 38 is constructed from a rigid polymeric material.

The base portion 22 is provided to receive the child seat 20 therein. The base portion 22 has a shell 190 constructed from a rigid polymeric material. The shell 190 includes an aperture 192 extending therethrough for receiving the seat belt webbing 14 therethrough.

The child restraint system and the child seat monitoring device provide a substantial advantage over other systems and methods. In particular, the child restraint system utilizes a child seat with a plurality of docking stations that are each configured to receive a child seat monitoring device. Thus, a person can position the child seat monitoring device at one of the docking stations that can be best viewed by the person when installing the child restraint system on a vehicle seat to obtain visual feedback messages indicating whether the child restraint system has been properly installed.

As described above, the child seat monitoring device 31 can implement methods for monitoring installation of the child restraint system 10 where the methods are embodied in the form of computer-implemented methods and apparatuses for practicing those methods. In an exemplary embodiment, the method is embodied in computer program code executed by one or more elements. The computer program code contains instructions embodied in tangible media, such as floppy diskettes, CD-ROMs, hard drives, flash memory, or any other computer-readable storage medium.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A child restraint system adapted to be mounted within a vehicle, the child restraint system comprising:

a child seat configured to receive a child occupant, the child seat having a frame, at least first and second docking stations, and a child seat monitoring device, the first and second docking stations having first and second electrical terminals, respectively, configured to be electrically coupled to the child seat monitoring device, the child seat monitoring device configured to execute a software algorithm to determine whether the child seat has been installed in accordance with a predetermined installation parameter, based on at least one signal received from at least one of the first electrical terminal and the second electrical terminal, the first and second docking stations being disposed at first and second locations on the frame, both of the first and second docking stations configured to receive and hold the child seat monitoring device therein, the first docking station having an outer peripheral wall and a rear wall, the outer peripheral wall defining an interior region for receiving the child seat monitoring device, the outer peripheral wall extending from a first end to a second end, the rear wall enclosing the second end of the outer peripheral wall, the child seat monitoring device having a front surface, a rear surface, a peripheral surface coupled between the front surface and the rear surface, and a plurality of light emitting indicators disposed on the front surface.

2. The child restraint system of claim 1, wherein the peripheral surface of the child seat monitoring device has at least first and second latching members extending therefrom.

3. The child restraint system of claim 2, wherein the outer peripheral wall of the first docking station defines first and second grooves extending from the second end toward the first end, the outer peripheral wall having first and second wall portions disposed in the first and second grooves, respectively, proximate the first end for holding the first and second latching members, respectively.

4. The child restraint system of claim 3, wherein the first latching member has a first operational position where the first latching member fixedly engages the first wall portion and a second operational position wherein the first latching member disengages the first wall portion.

5. The child restraint system of claim 1, wherein the peripheral surface of the child seat monitoring device has first and second tab members extending therefrom.

6. The child restraint system of claim 5, wherein the outer peripheral wall of the first docking station has first and second grooves extending from the second end toward the first end, the outer peripheral wall having first and second wall portions disposed in the first and second grooves, respectively, proximate the first end for holding the first and second tab members, respectively.

7. The child restraint system of claim 1, wherein the peripheral surface of the child seat monitoring device has first and second guiding members, respectively, extending therefrom.

8. The child restraint system of claim 7, wherein the outer peripheral wall of the first docking station has first and second grooves extending from the first end inwardly into the outer peripheral wall, the first and second grooves configured to receive the first and second guiding members, respectively, therein.

9. The child restraint system of claim 1, wherein the outer peripheral wall has a plurality of centering tabs into the interior region for centering the child seat monitoring device in the interior region.

10. The child restraint system of claim 1, wherein the rear wall of the first docking station has at least one cantilever beam portion configured to urge the child seat monitoring device disposed in the region toward the first end of the outer peripheral wall.

11. The child restraint system of claim 1, wherein the outer peripheral wall has generally rectangular ring shape.

12. The child restraint system of claim 1, wherein both of the first and second docking stations are further configured to release the child seat monitoring device therefrom.

13. The child restraint system of claim 1, wherein the child seat monitoring device is configured provide visual feedback messages indicating whether the child seat has been installed in the vehicle in accordance with at least one predetermined installation parameter.

14. The child restraint system of claim 1, wherein the child seat monitoring device comprises a processing unit configured to be electrically coupled to at least a first sensor generating a first signal indicative of a child seat parameter, the processing unit further configured to receive the first signal and to determine whether the child seat is installed in the vehicle in accordance with a predetermined installation parameter based on the first signal.

15. The child seat monitoring device of claim 1, wherein the child seat monitoring device has a CPU configured to execute the software algorithm to determine whether the child seat has been installed in accordance with the predetermined installation parameter.

16. A child seat monitoring device, comprising:
a removable housing configured to be removably secured to at least one docking station disposed on a child seat, the docking station having an electrical terminal; and
a processing unit disposed in the housing, the processing unit configured to be electrically coupled to the electrical terminal of the docking station when the removable housing is disposed in the docking station, the electrical terminal being further electrically coupled to at least a first sensor, the first sensor generating a first signal indicative of a child seat parameter, the processing unit further configured to receive the first signal and to determine whether the child seat is installed in a vehicle in accordance with a predetermined installation parameter based on the first signal, the processing unit being a CPU, the CPU configured to execute a software algorithm to determine whether the child seat has been installed in accordance with the predetermined installation parameter.

17. The child seat monitoring device of claim 16, wherein the housing has a front surface, a rear surface, a peripheral surface disposed between the front surface and the rear surface, first and second latching members extending from the peripheral surface, first and second tab portions extending from the peripheral surface, and at least one light emitting device operably coupled to the processing unit, the light emitting device being disposed on the front surface, the first and second latching members having a first operational position for coupling the housing to the docking station disposed on the child seat and a second operational position for decoupling the housing from the docking station.

18. The child seat monitoring device of claim 17, wherein the housing further comprises first and second guiding members, respectively, extending from the peripheral surface for guiding the housing into the docking station.

19. The child seat monitoring device of claim 17, wherein the processing unit is further configured to generate a second signal to induce the light emitting device to emit light when the first signal indicates the child seat was not installed in the vehicle in accordance with the predetermined installation parameter.

20. A child restraint system adapted to be mounted within a vehicle, the child restraint system comprising:
a child seat configured to receive a child occupant, the child seat having a frame, at least first and second docking stations, and a child seat monitoring device, the first and second docking stations being disposed at first and second locations on the frame, both of the first and second docking stations configured to receive and hold the child seat monitoring device therein, the first docking station having an outer peripheral wall and a rear wall, the outer peripheral wall defining an interior region for receiving the child seat monitoring device, the outer peripheral wall extending from a first end to a second end, the rear wall enclosing the second end of the outer peripheral wait, the child seat monitoring device having a front surface, a rear surface, a peripheral surface coupled between the front surface and the rear surface, and a plurality of light emitting indicators disposed on the front surface, the peripheral surface of the child seat monitoring device having at least first and second latching members extending therefrom.

* * * * *